March 10, 1959 S. HALBERT 2,876,970
AIRFOIL WITH MEANS FOR DISTRIBUTING DE-ICING FLUIDS
Filed Nov. 8, 1955 2 Sheets-Sheet 1
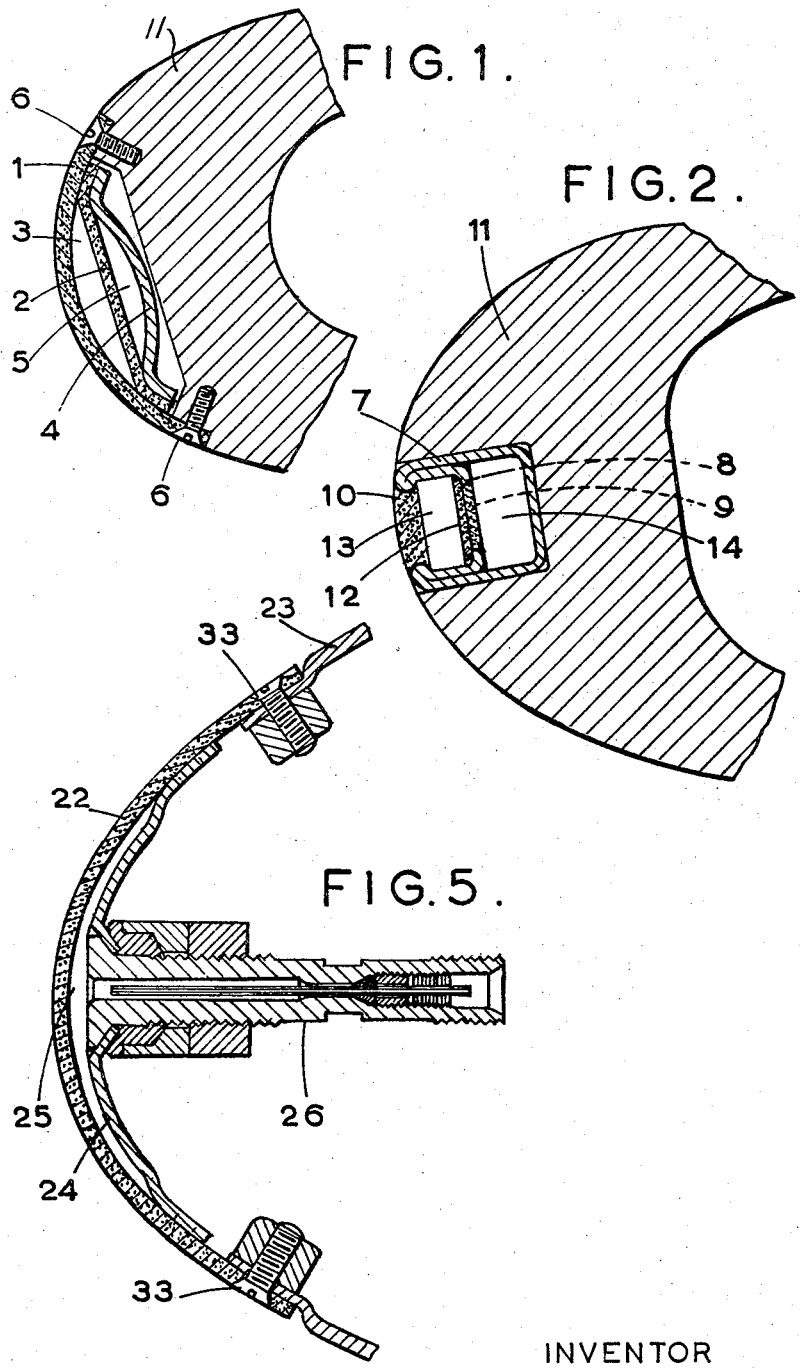
INVENTOR
S. HALBERT
BY
Young, Emery & Thompson
ATTORNEYS

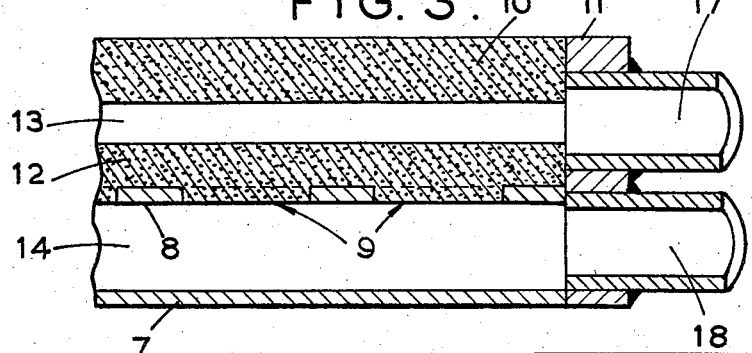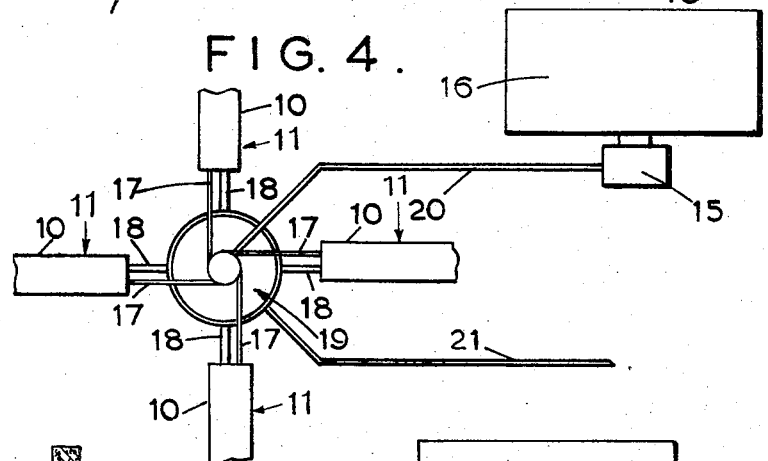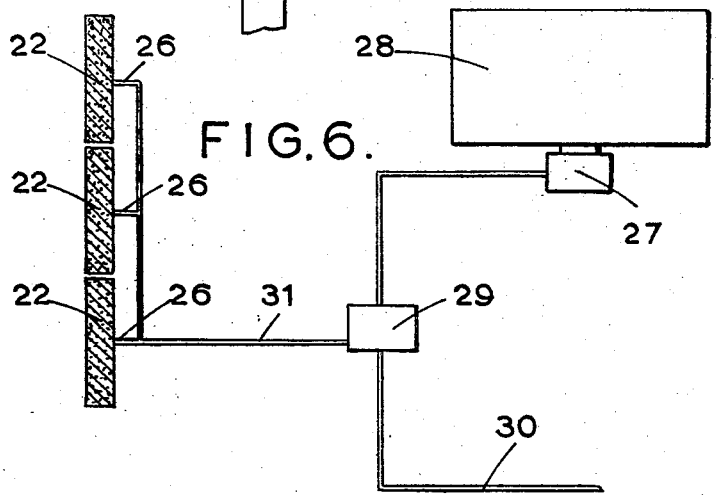

United States Patent Office 2,876,970
Patented Mar. 10, 1959

2,876,970
AIRFOIL WITH MEANS FOR DISTRIBUTING DE-ICING FLUIDS

Stuart Halbert, Ashcroft, Haltwhistle, England

Application November 8, 1955, Serial No. 545,686

Claims priority, application Great Britain November 12, 1954

5 Claims. (Cl. 244—134)

This invention relates to the distribution of liquids and particularly, but not exclusively, to the distribution of de-icing liquids on static and rotating aerofoils.

In the past, fluids have been induced to exude at low rates of flow substantially uniformly over the surfaces of porous sheets, for example porous metal sheets disposed at or in the leading edges of aerofoils, by ensuring that the resistance of such sheets is sufficient to maintain the required pressure in the fluid behind them at the rate of flow selected. In order to maintain the required magnitude and consistency of resistance, it has been proposed in the specification of British Patent No. 724,019 to provide the porous metal sheet with a backing sheet of flexible micro porous material.

It is an object of the present invention to provide a way of obtaining the same or improved uniformity of distribution of liquid over the same or greater vertical depths of porous metal at lower supply pressure, to simplify the design of distributors and to provide a means of distributing liquids satisfactorily over rotating aerofoils, such as the rotors of rotating wing aircraft. With this end in view, a liquid to be distributed is, according to this invention, mixed with air and brought into contact with one side of a porous wall so that it can pass through the wall and exude from the other side. The mixture of air and liquid, preferably to form a foam, produces a fluid mixture of low density which allows the resistance of the porous assembly to be so reduced that porous metal alone can be used without the flexible micro porous backing sheet described in the aforesaid British Patent No. 724,019. This permits welding to be used for assembly, and therefore simplifies general design, particularly the sealing of the distributor to prevent exudation of liquid other than through the face of the porous metal. One embodiment of the invention, which is intended primarily for rotating aerofoils, comprises an outer sheet of porous material over the surface of which the liquid is to be distributed, an inner sheet of porous material attached to the outer porous sheet in such a manner as to form a cavity into which liquid or a mixture of liquid and air can be introduced and a sheet of impervious material attached to the inner porous sheet in such a manner as to form a cavity into which air can be introduced. The skin of an aerofoil into which the device is fitted can be used to form the back of the air cavity in place of the sheet of impervious material mentioned above. Another embodiment, which is intended primarily for fixed aerofoils, comprises an outer sheet of porous material over the surface of which the liquid is to be distributed and a sheet of impervious material attached to the outer porous sheet in such a manner as to form a cavity into which a mixture of liquid and air can be introduced.

In the accompanying diagrammatic drawings:

Figure 1 is a cross-section through a device for distributing de-icing liquid over an aerofoil of a rotating wing aircraft, Figure 2 is a similar view of a modified device, Figure 3 is a part longitudinal section of the device illustrated in Figure 2, Figure 4 is a diagram illustrating the supply of de-icing liquid to the devices illustrated in Figures 1, 2 and 3, Figure 5 is a cross section through a device for distributing de-icing liquid over an aerofoil of a fixed wing aircraft, while Figure 6 is a diagram illustrating the supply of de-icing liquid to the device illustrated in Figure 5.

The distributor means illustrated in Figure 1 is intended for use in the rotating aerofoils of a rotating wing aircraft and is shaped to conform with the aerofoil into the leading edge of which it is to be fitted. The distributor comprises an outer porous wall or sheet 1 of stainless steel to which an inner porous wall or sheet 2 of stainless steel or of plastic is attached in such a manner as to provide a cavity 3. A wall or sheet 4 of non-porous stainless steel is attached to the inner porous sheet 2 in such a manner as to provide a cavity 5. The porous stainless steel sheets 1 and 2 and the solid stainless steel sheet 4 are preferably joined by seam or spot welding in such a fashion as to provide a fluid seal. The distributor is fixed to the aerofoil 11 by means of the fitting screws 6 or other suitable means.

The distributor illustrated in Figures 2 and 3 is built up from an extruded section 7, preferably of nickel-copper alloy. The extrusion 7 has a central septum 8 in which are closely spaced holes 9 of large diameter or slots. An outer porous skin 10 is formed by sintering metal powder into the jaws of the extrusion 7, the outer side being moulded to conform with the aerofoil 11 into the leading edge of which it is to be fitted. An inner porous septum 12 is of porous metal and is supported by the perforated septum 8 onto which it is sintered. Cavities 13 and 14 are formed in any suitable way. The distributor may be attached to the aerofoil by means of central screws (not shown) passing through ferrules brazed into the unit or by bonding into the housing provided in the aerofoil.

The devices illustrated in Figures 1 and 2 both operate in the same way. De-icing liquid is pumped by a pump 15 from a central reservoir 16 (Figure 4) either directly through a pipe 17 into the front cavity 3 (Figure 1) or 13 (Figure 2) of the distributor or alternatively, through a foam producing unit (not shown) in which it is mixed with air before passing into the cavity. The fluid or foam enters the distributor at the inner end (with respect to the axis of the rotating aerofoil) and is carried by centrifugal force towards the outer end. At the same time, rotation of the aerofoil 11 causes the fluid or foam to remain on the outer surface of the inner porous sheet 2 (Figure 1) or septum 12 (Figure 2). Air is introduced through a pipe 18 into the back cavity 5 (Figure 1) or 14 (Figure 2) at a suitable rate whence it passes through the inner porous sheet 2 or septum 12 forcing the liquid or foam away from the surface and through the outer porous skin 1 (Figure 1) or 10 (Figure 2). The liquid and air enter the pipes 17, 18 respectively through a rotating service joint 19 connected to supply pipes 20, 21.

Figure 5 shows a distributor in which an outer porous stainless steel wall or sheet 22 is shaped to conform with the aerofoil 23 into or onto the leading edge of which it is to be assembled. A sheet or wall 24 of solid stainless steel is attached to the sheet 22 in such a manner as to form a cavity 25 between it and the outer porous sheet 22. An entry tube 26 is sealed into the sheet 24 and may if desired contain a metering device. The sheets 22 and 24 are joined (preferably by seam or spot welding) in such a fashion as to form a seal around the cavity 25.

In operation liquid is pumped by a pump 27 (Figure 6) from a central reservoir 28 through a foam producing device 29 in which it is mixed with air from a supply line 30. The foam thus produced passes through pipe 31 to an entry tube 26 and into the cavity 25 whence it exudes through the porous outer sheet 22.

The distributor can be attached to the skin of the aerofoil by means of flush fitting screws 33 and floating anchor nuts or similar devices.

What I claim is:

1. Apparatus for distributing liquid comprising means forming a first cavity comprising an outer wall of porous material and an inner wall of porous material having at least a part thereof spaced from at least a part of said outer wall, means forming a second cavity comprising said inner wall and a liquid-impervious wall having at least a part thereof spaced from at least a part of said inner wall, said liquid-impervious wall being on the opposite side of said inner wall from said outer wall, means operatively connected to at least one of said walls for rotating said walls about an axis spaced therefrom, said walls thereby having inner and outer ends with respect to said axis, means operatively connected to said means forming said first cavity for introducing liquid or a mixture of liquid and air into said first cavity near the inner end thereof, and means operatively connected to the means forming said second cavity for introducing air into said second cavity near the inner end thereof.

2. A device for distributing de-icing liquid over a rotatable aerofoil of an aircraft comprising an aerofoil, means forming an outer cavity in said aerofoil comprising an outer wall of porous material at the leading edge of said aerofoil and an inner wall of said porous material having at least a part thereof spaced from at least a part of said outer wall, means forming an inner cavity in said aerofoil comprising said inner wall and a liquid-impervious wall having at least a part thereof spaced from at least a part of said inner wall, said liquid-impervious wall being on the opposite side of said inner wall from said outer wall, means operatively connected to the means forming said outer cavity for introducing de-icing liquid or a mixture of de-icing liquid and air into said outer cavity, and means operatively connected to the means for forming said inner cavity for introducing air into said second cavity.

3. Apparatus for distributing liquid comprising a liquid-impervious member which is of substantially U-shaped cross section and has a perforated septum extending between its two arms, an outer wall of porous metal bridging the space between the free edges of the two arms of said liquid-impervious member, a wall of porous metal supported on said perforated septum, means operatively connected to said U-shaped member for rotating said member about an axis spaced from one end thereof, said U-shaped member having thereby inner and outer ends, means operatively connected to said outer wall, said U-shaped member, and said perforated septum for introducing liquid or a mixture of liquid and air therebetween near the inner end thereof, and means for introducing air between the base of said U-shaped member and said perforated septum near the inner end thereof.

4. Apparatus for distributing liquid comprising means forming first and second cavities comprising an outer wall of porous material, a liquid-impervious wall having at least a part thereof spaced behind said outer wall, and an inner member of porous material arranged between said walls and spaced therefrom at least in part, means operatively connected to at least one of said walls for rotating said walls about an axis spaced therefrom, said walls thereby having inner and outer ends with respect to said axis, means operatively connected to the means for forming said first cavity for introducing liquid or a mixture of liquid and air thereinto near the inner end thereof, and means operatively connected to the means forming said second cavity for introducing air thereinto adjacent the inner end thereof.

5. A device for distributing de-icing liquid over a rotatable aerofoil of an aircraft comprising an aerofoil, means in said aerofoil for forming outer and inner cavities therein comprising an outer wall of porous material at the leading edge of said aerofoil, a liquid-impervious wall arranged on the inside of said outer wall and having at least a part thereof spaced from said outer wall, and an inner member of porous material between said walls and having at least a part thereof spaced from parts of said walls, means operatively connected to the said means forming the outer cavity for introducing de-icing liquid or a mixture of de-icing liquid and air thereinto, and means operatively connected to the means forming said inner cavity for introducing air thereinto.

References Cited in the file of this patent
UNITED STATES PATENTS

| | | |
|---|---|---|
| 2,372,581 | Jones | Mar. 27, 1945 |
| 2,390,093 | Garrison | Dec. 4, 1945 |
| 2,433,214 | Halbert et al. | Dec. 23, 1947 |
| 2,457,031 | Campbell et al. | Dec. 21, 1948 |
| 2,576,487 | Stanley | Nov. 27, 1951 |

OTHER REFERENCES

"Flight," November 23, 1950, page 468.